(12) United States Patent
Howson et al.

(10) Patent No.: US 11,315,302 B2
(45) Date of Patent: *Apr. 26, 2022

(54) DEDICATED RAY MEMORY FOR RAY TRACING IN GRAPHICS SYSTEMS

(71) Applicant: Imagination Technologies Limited, Kings Langley (GB)

(72) Inventors: John W. Howson, St. Albans (GB); Steven J. Clohset, San Francisco, CA (US); Ali Rabbani, Watford (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/411,628

(22) Filed: May 14, 2019

(65) Prior Publication Data

US 2019/0266782 A1    Aug. 29, 2019

Related U.S. Application Data

(63) Continuation of application No. 15/138,868, filed on Apr. 26, 2016, now Pat. No. 10,332,303.

(51) Int. Cl.
*G06T 15/06* (2011.01)
*G06T 1/60* (2006.01)
*G06T 1/20* (2006.01)

(52) U.S. Cl.
CPC ............. *G06T 15/06* (2013.01); *G06T 1/20* (2013.01); *G06T 1/60* (2013.01)

(58) Field of Classification Search
CPC .............. G06T 1/60; G06T 15/06; G06T 1/20
See application file for complete search history.

(56) References Cited

U.S. PATENT DOCUMENTS

| 7,969,424 | B2 | 6/2011 | Peterson et al. |
| 8,957,902 | B2 | 2/2015 | Bakalash |
| 2009/0322752 | A1 | 12/2009 | Peterson et al. |
| 2010/0328310 | A1* | 12/2010 | Peterson ................. G06T 15/06 345/426 |
| 2012/0075287 | A1 | 3/2012 | Park et al. |
| 2012/0081368 | A1 | 4/2012 | Park et al. |

(Continued)

FOREIGN PATENT DOCUMENTS

WO    01/63561 A1    8/2001

*Primary Examiner* — Ryan McCulley
(74) *Attorney, Agent, or Firm* — Potomac Law Group, PLLC; Vincent M DeLuca

(57) ABSTRACT

A ray tracing unit is implemented in a graphics rendering system. The ray tracing unit comprises: processing logic configured to perform ray tracing operations on rays, a dedicated ray memory coupled to the processing logic and configured to store ray data for rays to be processed by the processing logic, an interface to a memory system, and control logic configured to manage allocation of ray data to either the dedicated ray memory or the memory system. Core ray data for rays to be processed by the processing logic is stored in the dedicated ray memory, and at least some non-core ray data for the rays is stored in the memory system. This allows core ray data for many rays to be stored in the dedicated ray memory without the size of the dedicated ray memory becoming too wasteful when the ray tracing unit is not in use.

18 Claims, 5 Drawing Sheets

(56) References Cited

U.S. PATENT DOCUMENTS

| | | | |
|---|---|---|---|
| 2014/0028666 A1* | 1/2014 | Lee | G06T 15/06 345/419 |
| 2014/0111515 A1* | 4/2014 | Peterson | G06T 1/60 345/426 |
| 2015/0042651 A1 | 2/2015 | Dwyer | |
| 2015/0109302 A1 | 4/2015 | Lee et al. | |
| 2015/0228109 A1* | 8/2015 | Zimmerman | G06T 15/50 345/419 |
| 2015/0325033 A1 | 11/2015 | Bakalash | |
| 2016/0019672 A1 | 1/2016 | Bakalash | |
| 2016/0027203 A1 | 1/2016 | Lee et al. | |
| 2016/0071309 A1 | 3/2016 | Shin et al. | |
| 2016/0335028 A1* | 11/2016 | Chung | G06F 12/0855 |
| 2017/0236247 A1* | 8/2017 | Akenine-Moller | G06T 1/20 345/522 |

\* cited by examiner

DEDICATED RAY MEMORY FOR RAY TRACING IN GRAPHICS SYSTEMS

CROSS-REFERENCE TO RELATED APPLICATIONS AND CLAIM OF PRIORITY

This application is a continuation under 35 U.S.C. 120 of copending application Ser. No. 15/138,868 filed Apr. 26, 2016.

BACKGROUND

Graphics rendering systems can be configured to produce images from 3-D scene descriptions. The images can be photorealistic, or achieve other objectives. For example, animated movies can be produced using 3-D rendering techniques.

A variety of techniques for performing 3-D rendering are known. Two principal categories of 3-D rendering are rasterization oriented approaches, and ray tracing oriented approaches. Rasterization involves defining a view point for a 3-D scene containing geometry and a pixel array to be rendered from the scene. In most rasterization approaches, the geometry is reduced to triangular primitives, and those primitives are transformed into 2-D coordinates, with a depth value. It is determined what primitive is visible from each pixel (or part of a pixel), and that visible surface is shaded. Rasterization benefits from being able to easily parallelize computation, because each pixel is independent, and geometry can be streamed through a rasterization pipeline for processing. Therefore, rasterization is well suited to time sensitive rendering applications, such as video games. However, it is difficult and time consuming to produce sophisticated rendering outputs using rasterization.

In contrast, ray tracing mimics the natural interaction of light with objects, and sophisticated rendering features can naturally arise from ray tracing a 3-D scene. Ray tracing can be parallelized relatively easily on the pixel by pixel level also, because pixels generally are independent of each other. However, ray tracing cannot be pipelined in the same way as rasterization, because of the distributed and disparate positions and directions of travel of the rays in the 3-D scene, in situations such as ambient occlusion, reflections, caustics, and so on. Ray tracing allows for realistic images to be rendered but often requires high levels of processing power and large working memories, such that ray tracing can be difficult to implement for rendering images in real-time (e.g. for use with gaming applications), particularly on devices which may have tight constraints on silicon area, cost and power consumption, such as on mobile devices (e.g. smart phones, tablets, laptops, etc.).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a ray tracing unit comprising:
processing logic configured to perform ray tracing operations on rays;
a dedicated ray memory coupled to the processing logic and configured to store ray data for rays to be processed by the processing logic;
an interface to a memory system; and
control logic configured to manage allocation of ray data to either the dedicated ray memory or the memory system, such that core ray data for rays to be processed by the processing logic is stored in the dedicated ray memory, and at least some non-core ray data for the rays is stored in the memory system.

The processing logic may comprise ray intersection testing logic. In some examples, the core ray data is for use by the ray intersection testing logic, whereas the non-core ray data is not needed by the ray intersection testing logic. For example, the core ray data for a ray may include one or more of: an origin of the ray, a direction of the ray, a clipping length for the ray, a ray type of the ray, one or more indicators of the behaviour of the ray, a reference to a shader, an indication of an object which intersects with the ray, an intersection distance along the ray at which the intersection with the object occurs, barycentric coordinates within an intersected primitive for the intersection, cached vertex positions of vertices of an intersected primitive, and cached vertex attributes of the vertices of an intersected primitive. In some examples, the non-core ray data for a ray is defined by a shader that creates the ray.

The ray tracing unit may be coupled to a Graphics Processing Unit (GPU), wherein the GPU is configured to execute shaders thereby outputting rays to be processed by the ray tracing unit.

In particular, there may be provided a graphics rendering system comprising:
a Graphics Processing Unit (GPU) configured to execute shaders for processing graphics data;
a memory system; and
a ray tracing unit comprising:
processing logic configured to perform ray tracing operations on rays;
a dedicated ray memory coupled to the processing logic and configured to store ray data for rays to be processed by the processing logic; and
control logic configured to manage allocation of ray data to either the dedicated ray memory or the memory system, such that core ray data for rays to be processed by the processing logic is stored in the dedicated ray memory, and at least some non-core ray data for the rays is stored in the memory system.

The memory system may comprise a cache which is coupled to both the GPU and the ray tracing unit.

There is also provided a machine-implemented method of ray tracing using a dedicated ray memory configured to store ray data for rays, the method comprising:
managing allocation of ray data to either the dedicated ray memory or a different memory system, such that core ray data for rays to be processed by the ray tracing unit is stored in the dedicated ray memory, and at least some non-core ray data for the rays is stored in the memory system; and
performing ray tracing operations on rays using the core ray data for the rays stored in the dedicated ray memory.

In some examples, the dedicated ray memory is part of a ray tracing unit and the memory system is external to the ray tracing unit, wherein the ray tracing operations are performed at the ray tracing unit.

The ray tracing units described herein may be embodied in hardware on an integrated circuit. There may be provided a method of manufacturing, at an integrated circuit manufacturing system, a ray tracing unit. There may be provided an integrated circuit definition dataset that, when processed in an integrated circuit manufacturing system, configures the system to manufacture a ray tracing unit. There may be provided a non-transitory computer readable storage medium having stored thereon a computer readable description of an integrated circuit that, when processed, causes a layout processing system to generate a circuit layout description used in an integrated circuit manufacturing system to manufacture a ray tracing unit.

There may be provided an integrated circuit manufacturing system comprising:

- a non-transitory computer readable storage medium having stored thereon a computer readable integrated circuit description that describes any of the ray tracing units described herein;
- a layout processing system configured to process the integrated circuit description so as to generate a circuit layout description of an integrated circuit embodying any of the ray tracing units described herein; and
- an integrated circuit generation system configured to manufacture the ray tracing unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
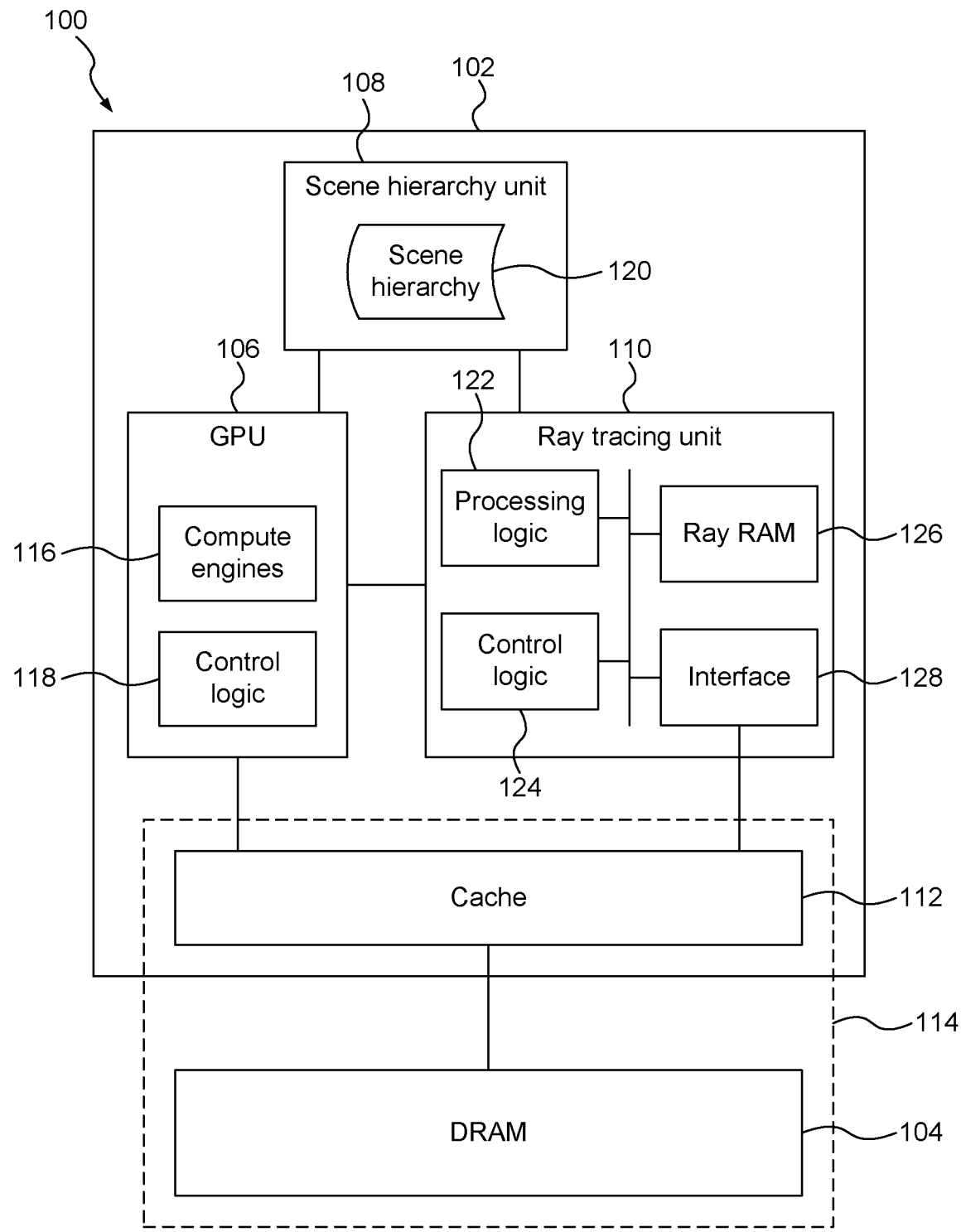
FIG. 1 depicts an example of a graphics rendering system comprising a ray tracing unit.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

According to examples described herein a ray tracing unit is implemented in a graphics rendering system for performing ray tracing operations. The ray tracing unit may be implemented (e.g. in hardware, such as in fixed-function circuitry) in order to accelerate the execution of ray tracing tasks. The ray tracing unit is a dedicated unit configured for performing ray tracing operations, and as such can perform ray tracing operations in an efficient manner, e.g. more efficiently (in terms of latency, power consumption and/or silicon size) compared to implementing ray tracing functionality on more general purpose processing units. Rays are defined by ray data which includes fields such as an origin and direction for the ray, and may include many other fields providing information relating to the ray. The ray tracing unit includes a dedicated ray memory, which may be referred to herein as a "ray RAM". The ray RAM may be implemented as a static Random Access Memory (RAM) to allow fast and power-efficient access to the data stored in the ray RAM for the ray tracing unit. The amount of ray data associated with a ray can be different in different examples. For example, some of the ray data may be defined by a shader which created the ray, and as such it may be considered to be beneficial to allow some flexibility in the types of ray data, and the amount of ray data, that can be stored for each ray. However, in conflict with the flexibility in the ray data, it can be beneficial to have a small amount of dedicated ray memory, specifically for use by the ray tracing unit. This is because the ray memory uses silicon area which is a very limited resource. Furthermore, at times when the ray tracing unit is not in use, the silicon used for the dedicated ray memory will be "dark silicon", i.e. not in use and thereby wasted. One option would be to reduce the number of rays that can be stored in the dedicated ray memory. However, it can facilitate the ray tracing process to allow ray data for a large number of rays to be stored in the ray memory, to reduce the likelihood of stalls in the operation due to insufficient space in the ray memory for storing new rays. Another option would be to reduce the amount of ray data that can be stored for each ray. However, this may reduce the options for the ways in which the ray data can be processed.

In examples described herein, the size of the dedicated ray memory is kept at a small size, whilst allowing the amount of ray data stored for each ray to be relatively high and whilst allowing the number of rays for which ray data is stored in the ray memory to be relatively high. This is achieved by storing some ray data (e.g. core ray data) for rays in the dedicated ray memory, but if more than a threshold amount of ray data (e.g. 32, 48, 64 bytes, etc.) exists for a ray, some of the ray data for the ray is stored in a memory system which is different to the dedicated ray memory. This may be referred to as "ray attribute spillover". For example, some non-core ray data for rays may be stored in a memory system which includes a cache and a Dynamic Random Access Memory (DRAM). For example, the non-core ray data may be data that is not needed by ray intersection testers implemented at the ray tracing unit. This allows the intersection testers at the ray tracing unit to access the core data from the dedicated ray memory, but still allows extra, non-core, ray data to be defined by shaders without increasing the size of the dedicated ray memory or reducing the number of rays that can have ray data stored in the ray memory at any given time. The ray data for a ray may be referred to as ray attribute data.

FIG. 1 illustrates a graphics rendering system 100 which comprises a processing chip 102 coupled to an external memory 104. In the example shown in FIG. 1, the memory 104 is implemented as a DRAM, but the memory 104 could be implemented as a different type of memory in other examples. The processing chip 102 comprises a Graphics Processing Unit (GPU) 106, a scene hierarchy unit 108, a ray tracing unit 110 and a cache 112. In other examples, the GPU 106, scene hierarchy unit 108, ray tracing unit 110 and cache 112 might not all be implemented on the same chip. The cache 112 is shown as separate to the GPU 106, scene hierarchy 108 and ray tracing unit 110, but in some examples, the cache 112 could be considered to be part of one of those units, e.g. part of the GPU 106. The cache 112 and the memory 104 may be referred to herein as a memory system 114. The GPU comprises compute engines 116 and control logic 118. The control logic 118 is configured to control the operation of the GPU 106. It is to be understood that FIG. 1 is a much-simplified diagram, and the GPU 106 may include further elements to those shown in FIG. 1. The scene hierarchy unit 108 is configured to generate and store a scene hierarchy 120, as described in more detail below. The ray tracing unit 110 comprises processing logic 122, control logic 124, a ray memory (or "ray RAM") 126 and an interface 128 to the memory system 114. The control logic 124 is configured to control the operation of the ray tracing unit 110.

Figure 2:
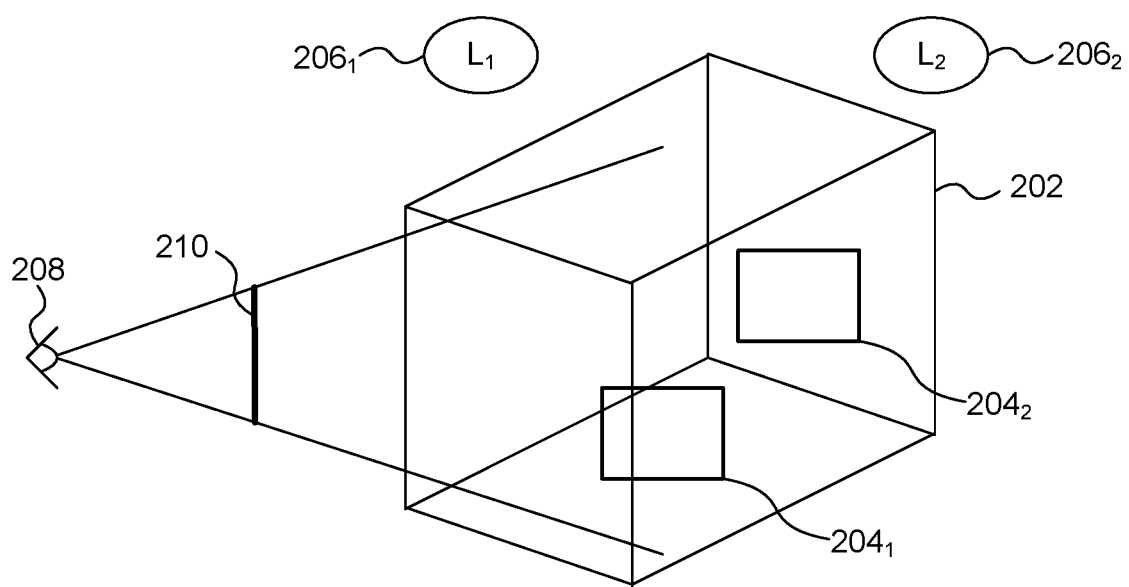
FIG. 2 shows a scene to be rendered from a viewpoint.

FIG. 2 shows an example of a scene 202 which includes two surfaces $204_1$ and $204_2$. This is a very simple example, and in other examples there would likely be many more surfaces and objects within the scene. FIG. 2 shows two light sources $206_1$ and $206_2$ which illuminate objects in the scene. The viewpoint from which the scene is viewed is shown at 208 and the view plane of the frame to be rendered is represented at 210.

Figure 3:
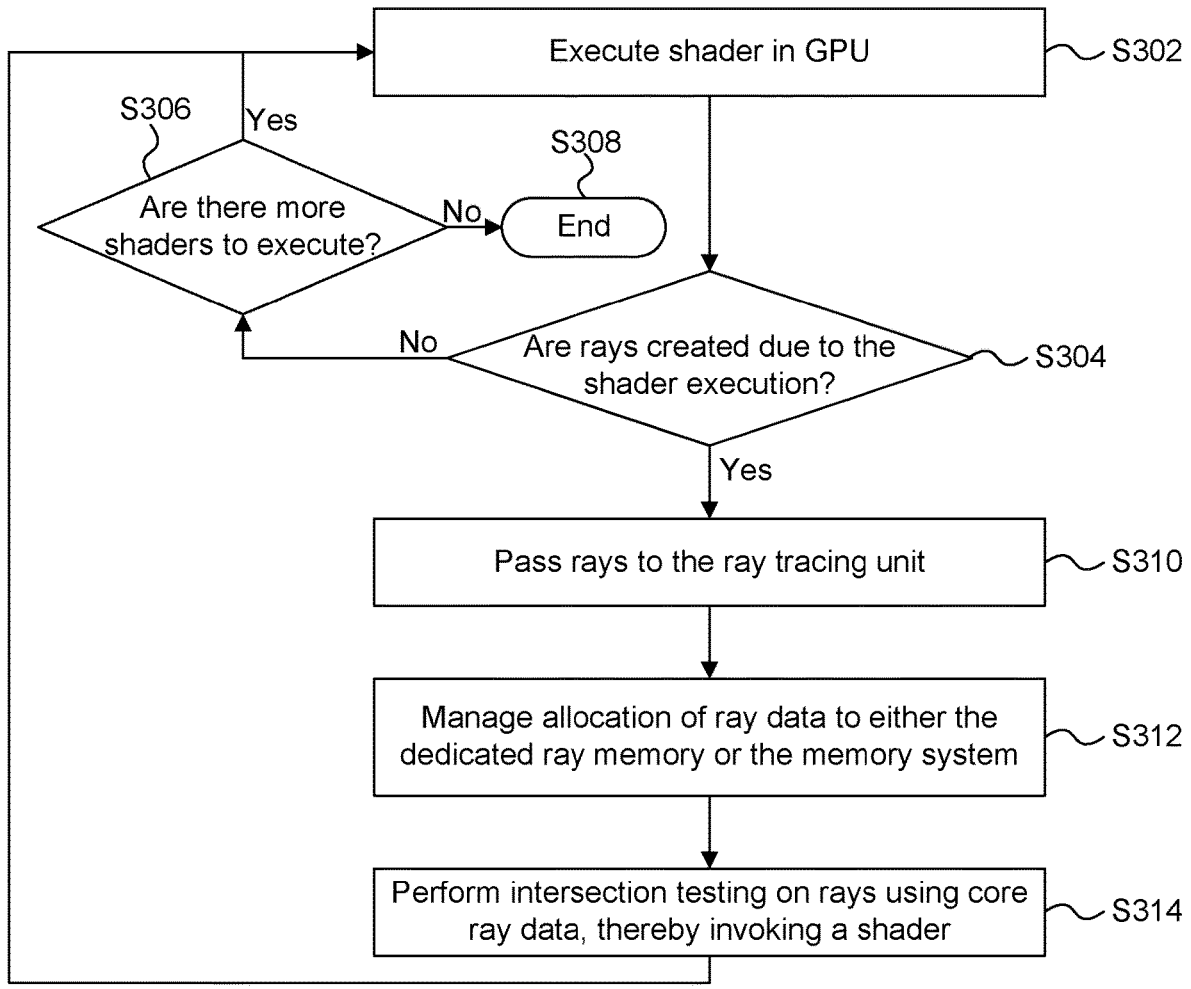
FIG. 3 shows a flow chart of a method of processing data in the graphics rendering system.

Operation of the graphics rendering system 100 is described with reference to the flow chart shown in FIG. 3.

In step S302, one or more shaders are executed at the GPU 106. For example, shaders may be executed by the compute engines 116 of the GPU 106.

The operation of the scene hierarchy unit 108 is slightly beyond the scope of the current disclosure, but as a brief overview, the scene hierarchy unit 108 builds a scene hierarchy 120, which may be referred to as an acceleration structure, and which represents spatial positions of objects in the scene in a manner which accelerates ray traversal of the geometry in the scene during ray intersection testing. For example, the scene hierarchy could be implemented as a bounding volume hierarchy of axis-aligned bounding boxes. The scene hierarchy unit 108 may read a control stream from the DRAM 104, allocate space for the shader output and start the execution of shaders (e.g. vertex shaders) on the GPU 106. The GPU may run one or more of vertex shaders, hull shaders, domain shaders and geometry shaders to build primitives (e.g. triangles or other shapes) and vertices in world space. The scene hierarchy unit 108 receives indications of the primitives, e.g. the vertex locations, and builds the scene hierarchy 120 for use during ray traversal by the ray tracing unit 110. The scene hierarchy 120 is stored (e.g. on chip 102, and/or in the memory system 114, e.g. in the cache 112 or in the DRAM 104. In the main examples described herein just one scene hierarchy is referred to, but it is to be understood that one or more scene hierarchies may be generated and stored for a particular render. Different scene hierarchies may represent different sets of one or more objects within a scene, e.g. there may be a first scene hierarchy for the background in a scene of a computer game, and a second scene hierarchy for a user-controlled character in the scene of the computer game. The generation of the scene hierarchy 120 may be performed in a separate phase (a scene hierarchy phase) to a ray tracing phase described in more detail below.

In the ray tracing phase, shaders that emit rays are executed on the GPU 106, the ray tracing unit 110 traverses those rays against the scene hierarchy to find ray intersections, and in response to finding the ray intersections further shaders can be executed on the GPU 106. The ray tracing unit 110 can accelerate the ray-primitive traversal using the scene hierarchy 120 and can gather rays with similar requirements into new tasks, which can improve the efficiency of the ray tracing operations, e.g. when the tasks are implemented in a Single Instruction Multiple Data (SIMD) manner on the processing logic 122.

The scene hierarchy phase for the next render (e.g. the next frame of a sequence of frames) can be overlapped with the ray tracing phase of the current render (e.g. the current frame of a sequence of frames).

As another example of a shader that may be executed on the GPU 106, a frame shader may be executed on the GPU 106 to generate primary rays in the scene. A frame shader builds primary rays with an origin set at the location of the viewpoint 208 and a direction pointing into the frame. Each ray may be assigned to one pixel in the frame of the view plane 210, wherein each pixel may have one or more rays assigned thereto. A frame shader may be programmed to represent a simple pin-hole camera, or to include more complicated camera effects such as depth of field. In some examples, a frame shader may not represent a camera, and for example may instead be used for baking a light map or performing a collision detection pass.

When the graphics rendering system 100 is arranged to implement ray tracing, then some shaders will create one or more rays to be processed by the ray tracing unit 110. In step S304 the GPU 106 (e.g. the control logic 118) determines whether any rays have been created due to the execution of the shader(s) in step S302. If no rays have been created then the method passes to step S306 in which the GPU 106 (e.g. the control logic 118) determines whether there are any more shaders to execute at the GPU 106. If there is at least one more shader to execute then the method passes back to step S302 such that one or more shaders are executed by the compute engines 116 of the GPU 106. If it is determined in step S306 that there are currently no more shaders to execute at the GPU 106 then the method ends at step S308.

If it is determined in step S304 that one or more rays are created due to the shader execution in step S302 then the method passes to step S310 in which the rays are passed to the ray tracing unit 110. The ray tracing unit 110 is configured to perform ray tracing operations, such as ray intersection testing on the rays it receives from the GPU 106.

In step S312 the control logic 124 manages allocation of ray data to either the dedicated ray memory 126 or the memory system 114. For example, at least the core ray data for the rays may be stored in the ray RAM 126. In examples described herein the core ray data for a ray is the data relating to the ray which is used by the processing logic 122, e.g. to perform ray tracing operations, such as to implement intersection testing. For example, the core ray data could be the information needed for intersection testing and also the result from the intersection testing.

Figure 4:
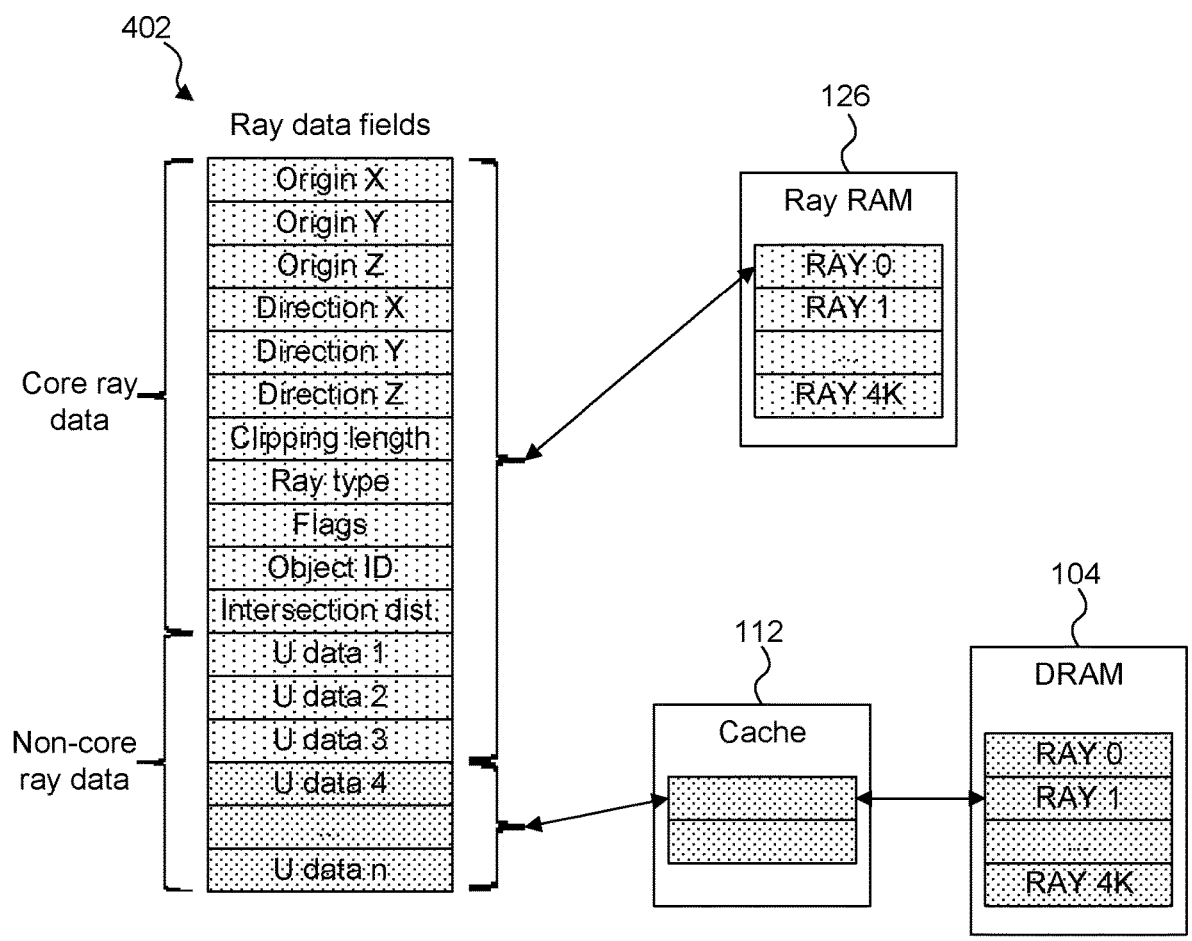
FIG. 4 shows the format of ray data according to a particular example.

FIG. 4 shows an example of the format of ray data 402 for a ray. The format of the ray data includes a number of different ray data fields. The different fields do not necessarily include the same number of bits of data. Some of the fields are considered core ray data, whereas other fields are considered non-core ray data. For example the non-core ray data may be defined by a shader which creates the ray. These shader-defined fields are denoted in FIG. 4 as "U data 1" to "U data n". In the example shown in FIG. 4 the core ray data for a ray includes three fields to define an origin of the ray (in world space), three fields to define a direction of the ray, a clipping length for the ray, a ray type of the ray, one or more indicators (e.g. flags) of the behaviour of the ray, an indication of an object which intersects with the ray, and an intersection distance along the ray at which the intersection with the object occurs.

In other examples, the core ray data may include other fields such as one or more of: a reference to a shader (e.g. an indication of a shader to be run in the event of a miss in the intersection testing and/or an indication of a shader associated with an intersected object which may be appropriate to run to process the intersection), barycentric coordinates within an intersected primitive for the intersection, cached vertex positions of vertices of an intersected primitive, and cached vertex attributes of the vertices of an intersected primitive. The number of bytes used for the ray data for a ray may vary in different examples, e.g. from between just a few bytes up to kilobytes. Similarly, the amount of ray data that may be core ray data may vary in different examples. The core ray data for the rays is stored in the ray RAM 126. FIG. 4 shows the ray RAM 126 storing data for a number of different rays, e.g. from ray 0 up to ray 4K. The ray RAM 126 may be able to store up to a predetermined maximum amount of ray data for a ray. As such, the control logic 124 may allocate (in step S312) up to the predetermined maximum amount of ray data for a ray to the ray RAM 126. In some examples, some non-core ray data may be stored in the ray RAM 126 with the core ray data. For example, the amount of data stored in the ray RAM 126 for a ray may be rounded up to x bytes, where is a power of two, e.g. x may be 32 or 64 or 128 to give some examples. Therefore, if the number of bytes which is taken up by the core ray data is not equal to a power of two, then some non-core ray data would be stored in the ray RAM 126. In the example shown in FIG. 4 three non-core ray data fields (U data 1 to U data 3) are stored in the ray RAM 126 with the core ray data. In the example shown in FIG. 4, the same amount of ray data is stored in the ray RAM 126 for each ray. In particular, in the example shown in FIG. 4, the same fields of ray data are stored in the ray RAM 126 for each ray. However, in the example shown in FIG. 4, not all of ray data for a ray is stored in the ray RAM 126 because at least some non-core ray data for the rays is stored in the memory system 114.

The remaining non-core ray data (e.g. fields "U data 4" to "U data n" shown in FIG. 4) for the rays is stored in the memory system 114. The ray data stored in the memory system 114 is stored in the DRAM 104. If possible the ray data stored in the memory system 114 is also stored in the cache 112 which provides faster access to the ray tracing unit 110 and the GPU 106 if needed, but the cache might not be large enough to store all of the ray data which is to be stored in the memory system 114.

The non-core ray data could be anything that a shader deems to be useful information for the ray, and examples include (but are not limited to):
colour data, e.g. representing a colour of light that the ray represents, e.g. the colour data may represent a wavelength of the light if the light is monochromatic,
information about an intersected object,
an indication of the medium through which the ray is travelling, e.g. a refractive index,
a pixel location to which the ray pertains, and
an ID of an object (e.g. a light source) towards which the ray is aimed.

The ray tracing unit 110 may consume ray data at a rate of the order of terabytes per second, so if the dedicated ray RAM 126 was not implemented then huge amounts of data would need to be transferred between the ray tracing unit 110 and the memory system 114. Implementing the ray RAM 126 as part of the ray tracing unit 126 helps to reduce the amount of data passing between the ray tracing unit 110 and the memory system 114.

The ray tracing unit 110 may support variable ray sizes. In other words, the amount of data for a ray may vary from ray to ray. In examples described herein, the core ray size can be fixed (e.g. each ray may have 64 bytes of core ray data just to give an example), but the amount of non-core ray data may vary for different rays, e.g. depending on the class, or type, of the ray. For example, an application which is causing the rendering process to be performed may set the amount of non-core ray data used for rays according to the ray class of the rays. For example, there may be a predetermined number of different ray sizes which are supported. The predetermined number of sizes can be different in different examples, but just to give some examples the predetermined number could be in the range from two to ten. Increasing the number of different ray sizes which are supported would increase the flexibility in the amount of ray data stored for each ray, but the amount of silicon area used would tend to increase. So there is a trade-off to be made when deciding the number of different ray sizes to be supported. The optimal number of supported ray sizes may be different in different scenarios.

For example, there may be N different address spaces (which may also be referred to "memory spaces") for storing the non-core ray attributes in the DRAM 104, where N can be the number of supported ray sizes or in some examples N may be one less than the number of supported ray sizes where one of the supported sizes corresponds to there being no non-core ray data. Each memory space is arranged to store non-core ray data for rays of a particular size. In other words, within a particular memory space, all of the rays have the same amount of non-core ray stored in the particular memory space. Rays of different sizes will have their non-core ray data stored in different memory spaces. The control logic 124 sends the non-core ray attributes to one of the address spaces based on the size of the incoming ray.

When ray data for a new ray is to be stored, the control logic 124 allocates a location in the corresponding memory space (for the size of the ray) to which the non-core ray attributes for the ray are to be written. This location is identified with an identifier, referred to herein as an Attribute Ray ID (ARID). The ARID is stored along with the core ray data in the ray RAM 126. To find the memory location (denoted "Memory_address(ray_id)" below) in the DRAM 104 for the non-core ray attributes of a ray, the ray ID is used to determine the base address of the appropriate memory space for the size of the ray (denoted "base_address_of_ ray_size(ray_id)" below), and then the ARID is used to go a particular number of rays into the memory space to identify the location of the non-core ray attributes for the ray. In other words, to find the memory location in the DRAM 104 for the non-core ray attributes of a ray, the following calculation can be used:

Memory_address(ray_id)=base_address_of_ray_size (ray_id)+ARID*Ray attribute size.

The control logic 124 allocates the ARIDs in a manner so as to pack the non-core ray attributes in the memory system 114 (e.g. in the DRAM 104). This achieves the maximum benefit from the caching in the cache 112. This "packing" of the non-core ray attributes into different memory spaces based on the amount of non-core ray data to be stored for a ray ensures efficient memory usage, even after non-core ray data for many rays has been written into and read from the memory system 114. In particular, within in each memory space different rays store the same amount of non-core ray data in the memory system 114, so when non-core ray data for a ray the memory space is no longer needed, it can be deallocated thereby leaving exactly the right amount of space for non-core ray data for a new ray of the same size to be written into the memory. Therefore efficient, contiguous memory usage can be maintained within each memory space. Furthermore, since there are multiple memory spaces for rays for different sizes, the ray tracing unit 110 still supports flexibility in ray size whilst achieving the efficient packing of non-core ray data in the memory system 114. It is noted that when a ray result has been read by a shader, the core ray data for the ray stored in the ray RAM 126 and the non-core ray data for the ray stored in the memory system 114 can be deallocated and can be used for another ray.

In step S314 the ray tracing unit 110 performs ray tracing operations on rays using the core ray data for the rays stored in the ray RAM 126. The ray tracing operations may include intersection testing of the rays against the scene hierarchy 120. The intersection testing on a ray uses the core ray data for the ray but the non-core ray data for the ray is not needed for the intersection testing. As well as intersection testing, the ray tracing unit 110 may perform shader coherency gathering to bundle together rays which execute the same shader to be run on the compute engines 116 of the GPU 106 at the same time.

When an intersection between a ray and a primitive of an object is determined in step S314, a shader is invoked for execution on the GPU 106. In particular, a ray shader associated with the intersected primitive is invoked and the ray shader can load the ray results for the primitive intersection into the GPU and the method passes back to step S302 to execute the ray shader on the compute engines of the GPU 106. Ray shader programs can be associated with components in the scene hierarchy or associated with the ray data of the ray. The ray's behaviour indicators and the geometry intersected or missed within the scene may determine which (if any) shader program should be run as a result of the intersection testing. If the intersection testing for a ray does not hit any primitives then the ray tracing unit 110 may launch a default shader or a shader defined in the ray data for the ray, which is then passed to the GPU 106 for execution thereon.

The result of executing the ray shader at the GPU 106 could be the creation of more rays, which may be referred to as "secondary rays". In particular, when a ray hits a surface, the ray intersection can generate secondary rays based on the material of the intersected object. Shaders which create secondary rays can generate rays of various types, e.g. glossy reflections or ambient occlusion effects or even just terminate. A ray shader can also accumulate a value (or colour) to a location in an image buffer at the location of the originating pixel.

By storing some ray data for the rays, but not all of the ray data for the rays, in the dedicated ray memory 126, the size of the dedicated ray memory 126 can be prevented from becoming too large, whilst still allowing flexibility in the amount of ray attribute data that can be stored for the rays. The efficiency of the ray tracing unit 110 improves with more rays in flight and the number of rays in flight is usually limited by the size of the ray RAM 126. Therefore, in most situations, it is beneficial to accept more rays in flight rather than storing more data for a smaller set of rays in on-chip memory.

Furthermore, there are two clients that need to read and write information in ray RAM 126: (i) shaders executing on the compute engines 116 of the GPU 106, and (ii) intersection testers implemented by the processing logic 122 in the ray tracing unit 110. In the life of a ray, a shader might write to the ray approximately once when it is initialized, and read from it approximately once when the result is shaded. The intersection testers, on the other hand might read the ray many times (e.g. dozens to hundreds of times) as the ray is tested against elements of the acceleration structure, and update the ray a handful of times when a hit is found that replaces the current hit as the best intersection result candidate.

The intersection testers may be implemented as fixed function units, and may only be able to interpret a subset of the ray data (e.g. the core ray data) for a ray that is part of the hardware ray format. The intersection testers don't care about the rest of the ray data (e.g. the non-core ray data). Therefore, it can be beneficial for the part of the ray that the intersection testers do care about (i.e. the core ray data) to be resident as close to the intersection testers as possible (i.e. in the dedicated ray memory 126 which may be implemented as SRAM), to minimize routing area. However, to maximize flexibility of the graphics rendering system 100 and to minimize silicon area that is "wasted" when ray tracing is not actively used, it can be beneficial not to have too much extra SRAM on the ray tracing unit 110 because it will be dark when the graphics rendering system 100 is not performing ray tracing. Therefore, it can be beneficial to allow some of the ray data (e.g. non-core ray data) to be stored in the memory system 114 to reduce the dedicated silicon area needed to support only ray tracing, and allow the larger caches to benefit all applications. It is noted that the cache 112 is usable by processing units other than the ray tracing unit 110 (e.g. the GPU 106 can use the cache 112).

Furthermore, dedicated SRAMs are more area and power efficient and faster to access than bigger caches. The reasons are numerous including the fact that the dedicated RAMs don't need as many ports as a larger cache, they can be closer to the clients (as discussed above), the extra coherency logic caches must have, etc. Big contributors are also the concomitant routing area and also the fact that general purpose caches must operate on cache line granularities, whereas dedicated RAMs can be optimized to precisely the needed width for the format being stored.

Therefore, the size of the ray RAM 126 is a trade-off between the flexibility of the design for many applications versus the efficiency while ray tracing.

In the examples described above, ray data for individual rays is split between the ray RAM 126 and the memory system 114. A portion of the software-defined ray attributes live in the DRAM hierarchy, preferably still resident in the cache 112, but they could be conceivably evicted between the time when the ray was written during emission, and the time the result was shaded. It is noted that the core ray data for a ray remains in the dedicated ray RAM 126 during ray traversal, even if the ray's software-defined attributes were evicted from cache 112. The cache 112 could be implemented as an L2 cache, and preferably has enough capacity to hold all the rays in the common case. However, cache logic which controls the operation of the cache 112 will balance holding ray attributes with all of the other clients of the cache 112, and make decisions about what to retain and what to evict from the cache 112. The cache control logic for the cache 112 could be given a hint to know that a given cache line contains ray attributes, and that may be taken into consideration when choosing what to evict/retain from/in the cache 112.

In some examples, there may be an error-avoiding, slow-path for ray processing. The ray tracing unit 110 can make scheduling decisions about which shaders to run on the GPU 106 in order to maintain a suitable number of free slots in the on-chip ray storage pool provided by the ray RAM 126. For example, the control logic 124 has information indicating what the worst case ray growth may be from running a shader on the GPU 106 and can use that information to decide which shaders to run in which order. However, sometimes a situation may be encountered where the ray tracing operations cannot make forward progress without exceeding the limit of ray storage in the ray RAM 126. In that case, the ray tracing unit may enter a mode (which may be referred to as a "Dump Rays" mode), where it faults some rays in hardware to DRAM, and makes their storage available to shaders for new rays. When a ray has been dumped, it cannot continue traversing with the hardware ray tracing unit before it has been recovered. Recovery of dumped rays may involve beginning their processing again through traversal of the hierarchy, but retaining their "best hit so far" information, so that they can be traversed more cheaply the second time around. In some examples, the ray tracing unit may fault additional data with the rays (e.g. data indicating the nodes of the scene hierarchy where the ray was waiting to be intersection tested), and that would allow traversal to resume more-or-less where it left off.

In other words, if the ray tracing operations cannot progress because the dedicated ray memory 126 does not have enough free space to store ray data for new rays, then ray data for some existing rays which have not finished being processed by the ray tracing operations can be evicted from the dedicated ray memory 126 to allow ray data for new rays to be stored in the dedicated ray memory 126, thereby allowing the ray tracing operations to progress. The evicted ray data can be returned to the dedicated ray memory 126 at a later time when the dedicated ray memory 126 has sufficient free space to store the evicted ray data. In some examples, the evicted ray data may include an indication of the best candidate for an intersection determined prior to the eviction for use in continuing the ray tracing operations on the ray data.

The core ray data described herein is the minimum amount of data that represents a ray. To put it another way, the core ray data includes all of the fields that the intersection testers implemented in the ray tracing unit 110 need to access (for reading or writing purposes). Therefore in examples described herein, the core ray data is kept in the dedicated ray memory 126 implemented in SRAM, on-chip and close to the processing logic 122. Some examples involve compressing the core ray data into a small format so that less data needs to be stored in the ray RAM 126 for each ray (which can result in data for more rays being able to be stored in the ray RAM 126, and/or a smaller ray RAM 126. It is noted that in some examples the non-core ray data is compressed. Different data compression techniques could be used in different examples for compressing the ray data.

As described above, the fields of the core ray data may comprise some or all of the following fields, and may include further fields not mentioned below (e.g. further software-defined fields):

Core fields initialized by shader may include some or all of:
  ray origin;
  ray direction;
  clipping length, which represents the maximum distance within which a hit is considered valid;
  behaviour flags—a series of bits to dictate the behaviour of the ray;
  ray class—assigning a type to a ray. Class can influence which shaders are run, mask visibility to certain geometry, etc.; and
  shader reference—a "ray-attached" shader to run for a miss or regardless, depending on behaviour flags.

Core fields representing result data, updated by intersection testers may include one or more of:
  Hit object—an identifier for the best hit candidate, e.g. a primitive ID or specific data loaded from the primitive during intersection testing in order to save the memory traffic of re-reading that data when it is time to shade the results.
  Intersection Distance—The distance to the best hit, so we can discard candidate objects that are already less suitable than the current best hit. It is noted that the clipping distance for the ray may be overloaded with the intersection distance for the ray.
  Barycentric coordinates—alpha & gamma (or u,v) to determine where, within a hit primitive, an intersection occurred. This can be stored here because it is a substantial amount of computation with additional memory reads to compute this prior to shading, while it's basically a by-product of the primitive-test algorithm.
  Cached vertex positions—Testing a triangle requires reading vertex positions from DRAM. Since they will need to be re-fetched for shading, it may be useful to cache them here.
  Cached vertex attributes—Same rationale as vertex positions. Sometimes the memory bandwidth associated with reading vertex attributes can be saved. This is especially true when the vertex positions are packed into the same format structure as the vertex positions and are thus read as part of the same cache line/memory burst.
  Shader ID—A shader associated with the object hit, which may be appropriate to run to process the intersection.

The GPU 106, scene hierarchy unit 108 and ray tracing unit 110 are shown in FIG. 1 as separate components, but in some examples, these components may not be implemented as separate units, such that the functionality of more than one of these components could be implemented by a single unit. For example a GPU could be implemented to perform the functionality of ray tracing unit 110 and the scene hierarchy unit 108 described herein.

In some examples, the graphics rendering system 100 could be a hybrid rendering system which combines rasterization functionality and ray tracing functionality.

Figure 5:
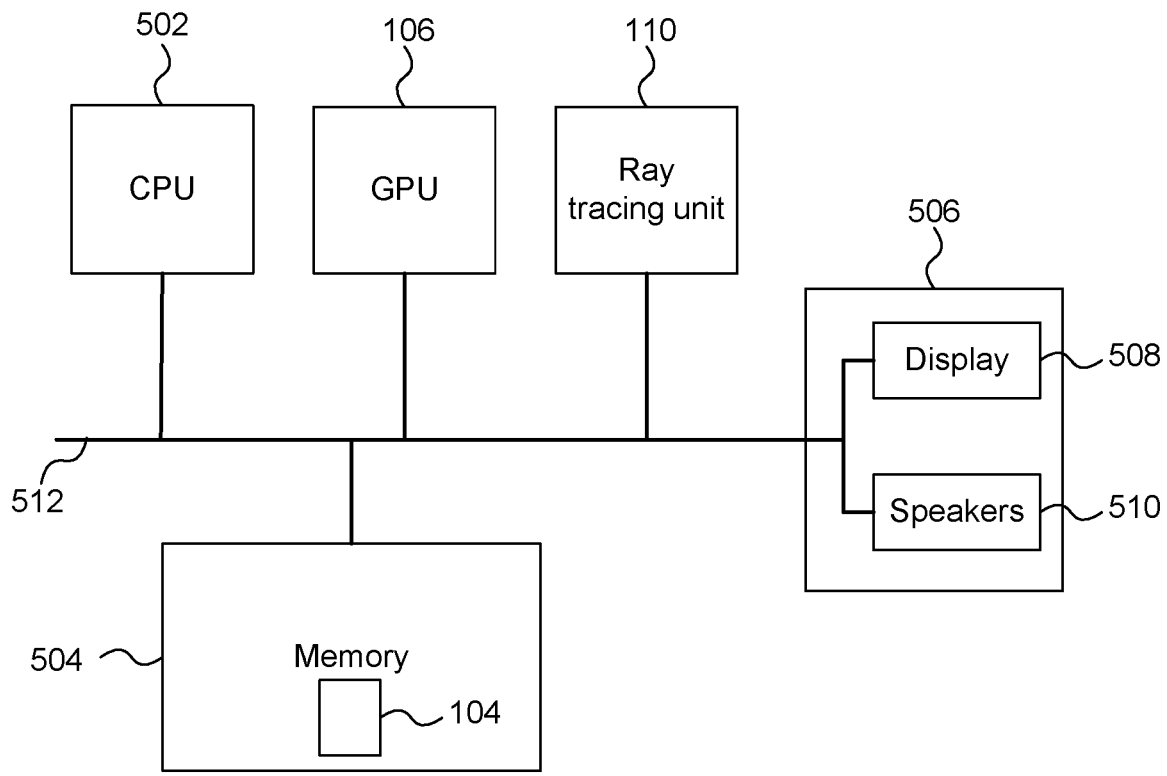
FIG. 5 shows a computer system in which a GPU and a ray tracing unit are implemented.

FIG. 5 shows a computer system in which the graphics rendering systems described herein may be implemented. The computer system comprises a CPU 502, the GPU 106, the ray tracing unit 110, a memory 504 and other devices 506, such as a display 508 and speakers 510. The components of the computer system can communicate with each other via a communications bus 512. The DRAM 104 may be implemented as part of the memory 504.

The graphics rendering system of FIG. 1 are shown as comprising a number of functional blocks. This is schematic only and is not intended to define a strict division between different logic elements of such entities. Each functional block may be provided in any suitable manner. It is to be understood that intermediate values described herein as being formed by a graphics rendering system need not be physically generated by the graphics rendering system at any point and may merely represent logical values which conveniently describe the processing performed by the graphics rendering system between its input and output.

The components of the graphics rendering system (e.g. the GPU and the ray tracing unit) described herein may be embodied in hardware on an integrated circuit. The components of the graphics rendering system (e.g. the GPU and the ray tracing unit) described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics rendering system, or one or more components thereof (e.g. a ray tracing unit), configured to perform any of the methods described herein, or to manufacture a graphics rendering system, or one or more components thereof (e.g. a ray tracing unit) comprising any apparatus described herein. An integrated circuit definition dataset may be, for example, an integrated circuit description.

Therefore, there may be provided a method of manufacturing, at an integrated circuit manufacturing system, a graphics rendering system, or one or more components thereof (e.g. a ray tracing unit) as described herein. Furthermore, there may be provided an integrated circuit definition dataset that, when processed in an integrated circuit manufacturing system, causes the method of manufacturing a graphics rendering system, or one or more components thereof (e.g. a ray tracing unit) to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics rendering system, or one or more components thereof (e.g. a ray tracing unit), will now be described with respect to FIG. 6.

Figure 6:
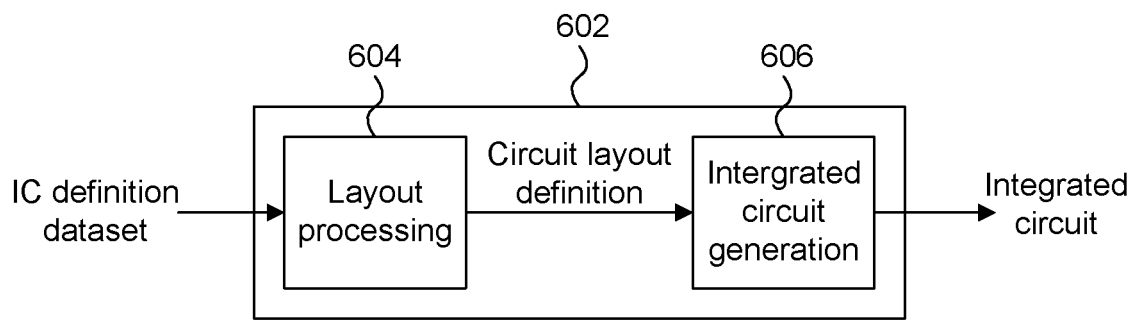
FIG. 6 shows an integrated circuit manufacturing system for generating an integrated circuit embodying a ray tracing unit.

FIG. 6 shows an example of an integrated circuit (IC) manufacturing system 602 which comprises a layout processing system 604 and an integrated circuit generation system 606. The IC manufacturing system 602 is configured to receive an IC definition dataset (e.g. defining a graphics rendering system, or one or more components thereof (e.g. a ray tracing unit), as described in any of the examples herein), process the IC definition dataset, and generate an IC according to the IC definition dataset (e.g. which embodies a graphics rendering system, or one or more components thereof (e.g. a ray tracing unit), as described in any of the examples herein). The processing of the IC definition dataset configures the IC manufacturing system 602 to manufacture an integrated circuit embodying a graphics rendering system, or one or more components thereof (e.g. a ray tracing unit), as described in any of the examples herein.

The layout processing system 604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 604 has determined the circuit layout it may output a circuit layout definition to the IC generation system 606. A circuit layout definition may be, for example, a circuit layout description.

The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics rendering system, or one or more components thereof (e.g. a ray tracing unit), without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A processing system operable to perform ray tracing operations, the processing system comprising:
   processing logic configured to process core ray data for rays;
   a first memory;
   control logic implemented in hardware configured to manage allocation of ray data for rays to either the first memory or a second memory, such that:
      for each of the rays, ray data for the ray is split into: (i) a first portion of ray data which comprises core ray data for the ray, and (ii) a second portion of ray data which comprises non-core ray data for the ray; and
      the first portion of ray data for each of the rays is stored in the first memory, and the second portion of ray data for each of the rays is stored in the second memory, wherein, for each of the rays, the ray data for that ray does not reference ray data for another ray;
   the processing logic and the first memory are part of a ray tracing unit; and
   the second memory is external to the ray tracing unit.

2. The processing system of claim 1 wherein the processing logic is coupled to the first memory.

3. The processing system of claim 1 wherein the processing logic comprises ray intersection testing logic, and wherein the core ray data is for use by the ray intersection testing logic, whereas the non-core ray data is not needed by the ray intersection testing logic.

4. The ray tracing system of claim 3 wherein the ray intersection testing logic is implemented in fixed-function hardware circuitry.

5. The processing system of claim 1 wherein the core ray data for a ray includes one or more of:
   an origin of the ray,
   a direction of the ray,
   a clipping length for the ray,
   a ray type of the ray,
   one or more indicators of the behaviour of the ray,
   a reference to a shader,
   an indication of an object which intersects with the ray,
   an intersection distance along the ray at which the intersection with the object occurs,
   barycentric coordinates within an intersected primitive for the intersection,
   cached vertex positions of vertices of an intersected primitive, and
   cached vertex attributes of the vertices of an intersected primitive.

6. The processing system of claim 1 wherein the non-core ray data for a ray is defined by a shader which creates the ray.

7. The processing system of claim 1 wherein the control logic is configured to manage the allocation of ray data, such that the first portion of ray data for each of the rays includes some non-core ray data for that ray.

8. The processing system of claim 1 wherein the second portion of ray data for each of the rays does not include core ray data for that ray.

9. The processing system of claim 1 comprising:
a Graphics Processing Unit (GPU) configured to execute shaders for processing graphics data;
a memory system which comprises the second memory; and
a ray tracing unit comprising:
processing logic configured to perform ray tracing operations on rays;
the first memory, wherein said first memory is coupled to the processing logic and configured to store ray data for rays to be processed by the processing logic; and
said control logic.

10. The processing system of claim 9 wherein the ray tracing unit supports a predetermined number of different ray sizes, and wherein the memory system has a plurality of memory spaces for storing non-core ray data for rays, each memory space being arranged to store non-core ray data for rays of a particular size, and wherein the control logic is configured to send non-core ray data for a particular ray to one of the memory spaces based on the size of the particular ray.

11. The processing system of claim 10 wherein the control logic is configured to cause the non-core ray data for rays to be packed into the memory spaces in the memory system.

12. The processing system of claim 1, wherein the first memory is accessible by the processing logic faster than the second memory is accessible by the processing logic.

13. A machine-implemented method of performing ray tracing operations, the method comprising:
for each of a plurality of rays, splitting ray data for the ray into: (i) a first portion of ray data for the ray, and (ii) a second portion of ray data for the ray;
allocating ray data to either a first memory or a second memory, such that the first portion of ray data for each of the rays is stored in the first memory, and the second portion of ray data for each of the rays is stored in the second memory; and
performing, by processing logic, ray tracing operations using the first portion of ray data stored in the first memory, wherein, for each of the rays, the ray data for that ray does not reference ray data for another ray,
wherein the first memory is accessible by the processing logic faster than the second memory is accessible by the processing logic.

14. The machine-implemented method of claim 13 wherein the first portion of ray data for each of the rays comprises core ray data for that ray, and wherein the second portion of ray data for each of the rays comprises non-core ray data for that ray.

15. The machine-implemented method of claim 14 wherein said performing ray tracing operations comprises performing intersection testing using the core ray data, wherein the non-core ray data is not needed for the intersection testing.

16. The machine-implemented method of claim 13 wherein if the ray tracing operations cannot progress because the first memory does not have enough free space to store ray data for new rays, then ray data for some existing rays which have not finished being processed by the ray tracing operations is evicted from the first memory to allow ray data for new rays to be stored in the first memory thereby allowing the ray tracing operations to progress,
wherein the evicted ray data is returned to the first memory at a later time when the first memory has sufficient free space to store the evicted ray data, and wherein the evicted ray data includes an indication of the best candidate for an intersection determined prior to the eviction for use in continuing the ray tracing operations on the ray data.

17. The method of claim 13, wherein the processing logic and the first memory are part of a ray tracing unit, and wherein the second memory is external to the ray tracing unit.

18. A non-transitory computer readable storage medium having stored thereon a computer readable description of an integrated circuit that, when processed in an integrated circuit manufacturing system, causes the integrated circuit manufacturing system to manufacture a processing unit which comprises:
processing logic configured to process core ray data for rays;
a first memory; and
control logic configured to manage allocation of ray data for rays to either the first memory or a second memory, such that:
for each of the rays, ray data for the ray is split into: (i) a first portion of ray data which comprises core ray data for the ray, and (ii) a second portion of ray data which comprises non-core ray data for the ray; and
the first portion of ray data for each of the rays is stored in the first memory, and the second portion of ray data for each of the rays is stored in the second memory, wherein, for each of the rays, the ray data for that ray does not reference ray data for another way;
wherein the processing logic and the first memory are part of a ray tracing unit; and
the second memory is external to the ray tracing unit.

* * * * *